United States Patent
Lessin et al.

(10) Patent No.: US 9,781,218 B2
(45) Date of Patent: Oct. 3, 2017

(54) MANAGING INFORMATION ABOUT USER STATES IN A SOCIAL NETWORKING SYSTEM

(71) Applicant: Facebook, Inc., Menlo Park, CA (US)

(72) Inventors: Samuel Lessin, Palo Alto, CA (US); Robert Taaffe Lindsay, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 99 days.

(21) Appl. No.: 13/911,378

(22) Filed: Jun. 6, 2013

(65) Prior Publication Data
US 2014/0365566 A1    Dec. 11, 2014

(51) Int. Cl.
G06F 15/16    (2006.01)
H04L 29/08    (2006.01)
H04W 4/20    (2009.01)

(52) U.S. Cl.
CPC ............ *H04L 67/22* (2013.01); *H04W 4/206* (2013.01)

(58) Field of Classification Search
None
See application file for complete search history.

(56) References Cited

U.S. PATENT DOCUMENTS

| | | | |
|---|---|---|---|
| 9,270,778 B1* | 2/2016 | Brown | G06Q 30/02 |
| 2006/0170945 A1* | 8/2006 | Bill | G06F 17/30749 358/1.13 |
| 2009/0234876 A1* | 9/2009 | Schigel | G06F 17/30873 |
| 2012/0166532 A1 | 6/2012 | Juan et al. | |
| 2012/0185486 A1* | 7/2012 | Voigt et al. | 707/741 |
| 2012/0209908 A1* | 8/2012 | Angelos | G06Q 50/01 709/204 |
| 2012/0331063 A1 | 12/2012 | Rajaram | |
| 2014/0223462 A1* | 8/2014 | Aimone et al. | 725/10 |
| 2014/0344031 A1* | 11/2014 | Lineberger | H04L 67/10 705/14.5 |

* cited by examiner

*Primary Examiner* — Esther B Henderson
(74) *Attorney, Agent, or Firm* — Fenwick & West LLP (57) ABSTRACT

When a social networking system receives content describing a user via a client device associated with the user, the social networking system determines a state describing a characteristic of the user from the content. One or more options for generating a content item associated with the determined state are provided to the client device for presentation to the user, and the options may be based in part on the determined state. Based on the state and selection of one or more of the options, a content item is generated and provided to one or more client devices for presentation to social networking system users. By interacting with the content item, users may view additional information about the state or perform actions associated with the state.

25 Claims, 7 Drawing Sheets

Samantha Wyatt (Sam)

Studied at UC Berkeley

About | Friends | Photos | Map 2 | Likes 12

Sort  Filter  Most Common  Search

Sam is hungry
1:30 pm on January 17, 2013
MeToo Blast

Sam is listening to Radioactive by Imagine ...
11:08 am on January 17, 2013
MeToo Blast Sam is at work
8:30 am on January 17, 2013
MeToo Blast Sam wants to watch a movie
10:17 a.m. January 13, 2013
MeToo Blast Sam is taking scuba lessons.
December 3, 2012 to December 20, 2012
MeToo Blast Activity Recent Sam shopped...handbags...on Gilt
Like ° Comment Likes                                      See All Juice bar | The Cheesecake | Cuts Global | Doe Skincare

MANAGING INFORMATION ABOUT USER STATES IN A SOCIAL NETWORKING SYSTEM

BACKGROUND

This invention relates generally to social networking systems, and in particular to managing states describing users of a social networking system.

A social networking system allows its users to connect to and communicate with other users of the social networking system. Users create profiles on the social networking system that are tied to their identities and include information about the users, such as interests and demographic information. The users may be individuals or entities such as corporations or charities. Because of the increasing popularity of social networking systems and the significant amount of user-specific information maintained by social networking systems, a social networking system presents an ideal forum for users to share their interests and experiences with other users. For example users provide a social networking system with information describing their characteristics, allowing the social networking system to maintain states that describe characteristics of various users. Examples of user characteristics described by a state include a user's locations, actions, emotions, circumstances, attributes, thoughts, etc.

Conventional social networking systems allow users to post content about themselves and other users through status updates and other types of posts on the social networking system. For example, a user may check-in to a location and upload a photograph taken at the location to indicate to the social networking system that it was at the location. The content provided by the user is presented to other social networking system users as a story identifying the user and the provided content.

However, if a user posts a large amount of content about itself over a long period of time, it may be difficult for the user, or other users, to navigate or to manage the information. For example, a user training for a marathon may recall that another user posted content to the social networking system about training for a similar event. However, to retrieve this information, the user may have to search through multiple years of posted content to find the relevant information. Additionally, if the user is unsure of the identity of the user who posted the content about training for a similar event, the amount of the information for the user to search significantly increases. For example, the user may need to search through multiple years of content posted by multiple users to identify the relevant information. Additionally, the information identified by the user may be incomplete; in the preceding example, the training-related information may omit information indicating how long the posting user trained for the event. Thus, managing a significant amount of information maintained by a social networking system may diminish user experience.

SUMMARY

A social networking system maintains information describing one or more states of a user and displays a description of a user's state. For example, information describing a user's state is displayed in a state display on a profile page for the user. An additional user viewing information describing a state of another user may interact with the displayed information to access additional information about the user. Examples of additional information about the user that may be accessed include: additional states associated with the user, states the viewing user shares with the user, and the most common states associated with the user. Additionally, a user viewing another user's state information may attribute a state of the other user to itself. For example, a user may access an interface element displayed along with an additional user's state information to associate the additional user's state with the user.

A user viewing information describing its own state may add, edit, or delete a state, or enter an end date for a state where applicable (e.g., training for a marathon, remodeling a house, etc.). Additionally, a user may interact with displayed state information to filter or sort states (e.g., by date, time, type, etc.), and to view more information associated with a particular state (i.e., "pivot around" the particular state). For example, a user viewing state information interacts with information describing a state to view a list of other users connected to the viewing user who share the state. Aggregations or summaries of information about a user's states over time and/or changes in those states may be communicated to other users through stories displayed on newsfeeds, notifications, instant messages, or through any other suitable communication channels. In some embodiments, users may perform searches to identify states or to identify users having a specified state For example, users may search for other users sharing or describing a particular state. Search results may be presented as aggregations or summaries that include an option for a user to attribute a state to itself or to other users.

A user may base its notification preferences on its state. For example, a user may limit receipt of notifications from the social networking system to notifications associated with other users having a particular characteristic based on the user's state. Users' states, in accordance with user-specified privacy settings, may also be used to target users for advertisements. For example, users indicating that they are tired may be specifically targeted for coffee advertisements. Additionally, applications may receive information about a user's state the social networking system based on permissions set by the user; similarly, an application may post information about a user's state received from the social networking system based on permissions specified by the user. For example, a restaurant application may only receive information describing a user's state when the state involves the user being hungry.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system receives information from a user describing characteristics of the user and stores the information as a state describing one or more characteristics of the user. Examples of user characteristics described by a state include a user's locations, emotions, actions, attributes, circumstances, thoughts, etc. The information describing a user's state may be presented to other users of the social networking system. For example, information describing a user's state is presented in a state display on a profile page for the user maintained by the social networking system. To allow users to more easily manage and obtain information associated with states, the social networking system allows its users to interact with information describing a user's state or with information describing an additional user's state.

Social networking system users may interact with presented information describing a user's state in various ways. For example, a user may add, remove, edit, or otherwise modify information describing the user's state and presented by the social networking system. In various embodiments, the user may perform additional actions related to the information describing the user's state. A user viewing information (a "viewing user") describing a state of an additional user may view individual or multiple states associated with the additional user, states shared between the viewing user and the additional user, states most commonly associated with the additional user. Further, the viewing user may sort or filter states associated with the additional user or attribute the additional user's state to the viewing user or to another user. A users may also view information associated with a particular state, such a number of other users currently associated with the state, users connected to a user viewing the user that are also associated with the state, or other suitable information. In one embodiment, information associated with a particular state is presented to a user when the user selects a state ("pivots" around the state). A user may interact with a content item in a display including state information, access an icon or other user interface element, or perform any other suitable action to pivot around a state.

A social networking system user may also use information describing one or more states to search for information maintained by the social networking system. For example, a user searches for: other users sharing the user's state, other users associated with a state, or other users having a combination of states. Search results may be presented to the user as aggregations or summaries of information about various states associated with one or more users over a period of time or as a cumulative total.

Information associated with states of users may be used to enhance distribution of messages, notifications, advertisements, or other content to social networking system users. For example, a social networking system user specifies notification preferences limit receipt of notifications to notifications from additional users based on the user's state. As a specific example, a user may specify a setting so that the user does not receive notifications from other users indicated as co-workers while the user is associated with a state indicating the user is on vacation. Additionally, in accordance with a user's privacy settings, state information associated with a user may be used to target advertisements to the user. For example, users associated with a state indicating they are getting married may be targeted to receive advertisements for photographers or caterers. Further, information describing a user's state be received or used by applications based on permissions set by the user. For example, a fitness application may post a user's states associated with eating and exercise subject to the user's permissions.

System Architecture

Figure 1:
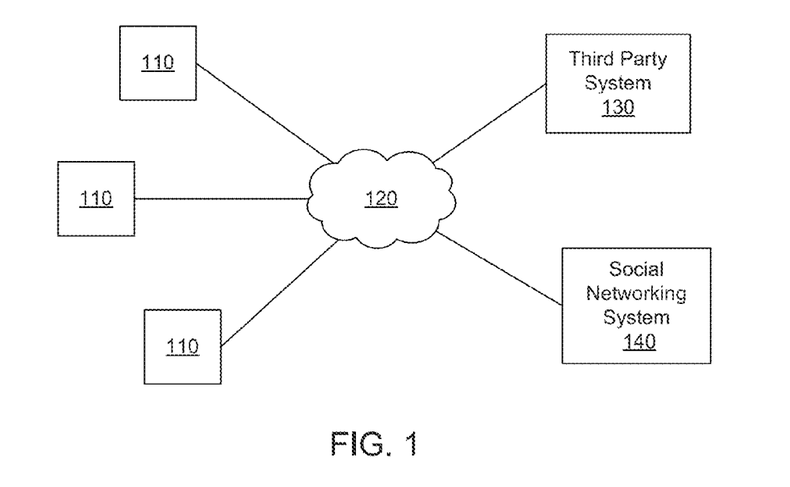
FIG. 1 is a block diagram of a system environment in which a social networking system operates, in accordance with an embodiment of the invention.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the social networking system 140, such as advertisements, content, or information about an application provided by the third party website 130.

Figure 2:
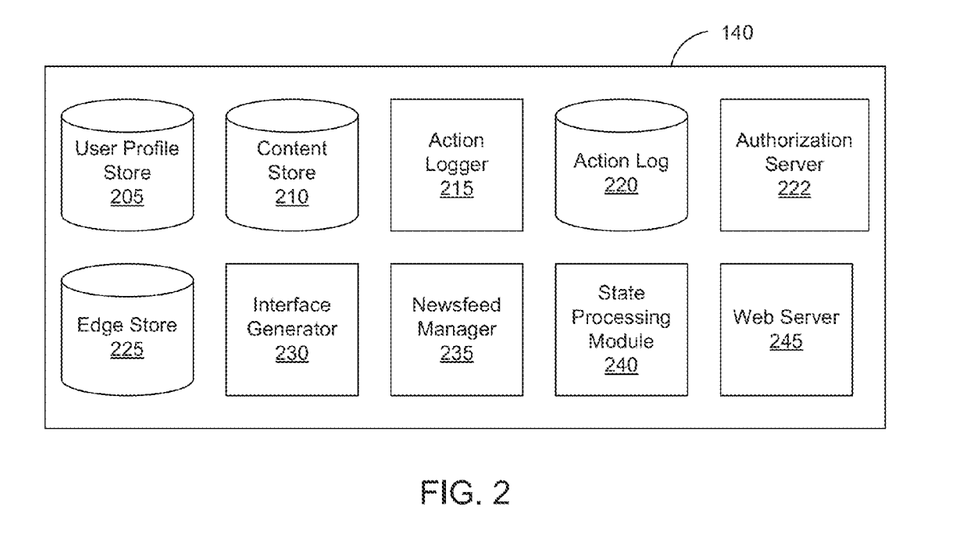
FIG. 2 is a block diagram of a social networking system, in accordance with an embodiment of the invention.

FIG. 2 is an example block diagram of an architecture of the social networking system 140. The social networking system 140 shown in FIG. 2 includes a user profile store 205, a content store 210, an action logger 215, an action log 220, an authorization server 222, an edge store 225, an interface generator 230, a newsfeed manager 235, a state processing module 240, and a web server 245. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

Declarative information about a user and stored in a user profile may describe a state of a user. A user's state describes one or more characteristics of the user. Examples of characteristics described by a user's state include the user's locations (e.g., Chinatown in San Francisco, Calif.), emotions (e.g., anxious), actions (e.g., jogging), attributes (e.g., artistic), circumstances (e.g., hungry), thoughts (e.g., desire to buy a new car), or other information describing the user. Additional content may be associated with a user's state. For example, images, text data, audio date, dates (e.g., publication date or time span of state), privacy settings (e.g., who may view the state), or any other suitable information may be associated with information describing a user's state.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

The authorization server 222 enforces one or more privacy settings of the users of the social networking system 140. A privacy setting of a user determines how particular information associated with the user may be shared. In one embodiment, a privacy setting is a specification of particular information associated with a user and a specification of one or more entities with which the specified information may be shared. Examples of entities with which information may be shared may include other users, applications, third party systems 130, or any entity that may potentially access the information. Examples of information that a user may share with one or more entities include user profile information such as state information, declarative information, profile photo, phone numbers associated with the user, user's connections, actions taken by the user such as adding a connection, changing user profile information, and other suitable information.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The interface generator 230 generates one or more interfaces, such as web pages, including content from the social networking system 140. For example, interfaces generated by the interface generator 230 include images, video, profile information, or other data. The interface generator 230 also generates one or more interfaces allowing the social networking system 140 to request information from users and for users to provide information to the social networking system 140 via the client device 110 and the network 120. For example, the interface generator 230 generates a form for a user to provide biographic information, such as the user's age, for inclusion in the user's user profile. When other users request a user's profile page, the interface generator 230 retrieves data from the profile store 205 and generates a representation of the information in the user profile for presentation by the client device 110.

The interface generator 230 also generates a state user interface, which allows a user to add, modify or remove a state. Additionally, the interface generator 230 may generate a state display interface, which displays states of a user to additional users of the social networking system 140. In some embodiments, the interface generator 230 generates a state search user interface enabling users to perform searches for information maintained by the social networking system 140 associated with a state. For example, a user provides content to the social networking system describing one or more characteristics of the user through the state user interface; information received through the state user interface may subsequently be displayed on a profile page for the user, such as in a state display region of the profile page. The state user interface may display options associated with a state to allow a user to provide additional information describing the state. For example a user may include a date, upload an image or video, specify privacy settings for the content, or perform other actions associated with a state. Examples of actions associated with a state include sending notifications to other users to determine if the other users currently share a particular state, searching for other users having a particular state, and searching for other users associated with multiple states.

The state display interface allows users to scroll through a list of states associated with an additional user, view multiple states associated with an additional user, filter or sort states associated with additional users (e.g., by date, time or type), or view the state most commonly describing a user. A user may also view information specific to a state, ask other users if the other users are associated with a state, or search for other users sharing a state with the user, or search for additional users having one or more identified states. For example, the state search user interface allows a user to identify additional users sharing a particular state or additional users having a particular state. Search results presented to users may also include an option for a user presented with the search results to attribute states included in the search results to the user, an option for the user suggest or attribute a state included in the search results to another users, or an option for performing other actions. The state user interface, the state display interface, and the state search user interface are further described below in conjunction with FIGS. 3-6.

In one embodiment, the social networking system 140 identifies stories likely to be of interest to a user and presents them through a "newsfeed" to the user. A story presented to a user describes an action taken by another user connected to the user and identifies the other user. In some embodiments, a story describing an action performed by a user may be accessible to users that are not connected to the user that performed the action. The newsfeed manager 235 may generate stories for presentation to a user based on information in the action log 220 and in the edge store 225 or may select candidate stories included in the content store 210. One or more of the candidate stories are selected and presented to a user by the newsfeed manager 235.

For example, when the newsfeed manager 235 receives a request to present one or more stories to a social networking system user, the newsfeed manager 235 accesses one or more of the user profile store 205, the content store 210, the action log 220, and the edge store 225 to retrieve information about the identified user. Stories or other data associated with users connected to the identified user are retrieved and analyzed by the newsfeed manager 235 to identify content likely to be relevant to the identified user. For example, stories associated with users not connected to the identified user, or stories associated with users for which the identified user has less than a threshold affinity, are discarded as candidate stories. Based on various criteria, the newsfeed manager 235 selects one or more of the candidate stories for presentation to the identified user.

In various embodiments, the newsfeed manager 235 presents stories to a user through a newsfeed, which includes a plurality of stories selected for presentation to the user. The newsfeed may include a limited number of stories or may include a complete set of candidate stories. The number of stories included in a newsfeed may be determined in part by a user preference included in user profile store 205. The newsfeed manager 235 may also determine the order in which selected stories are presented via the newsfeed. For example, the newsfeed manager 235 determines that a user has a highest affinity for a specific user and increases the number of stories in the newsfeed associated with the specific user or modifies the positions in the newsfeed where stories associated with the specific user are presented.

The newsfeed manager 235 may also account for actions by a user indicating a preference for types of stories and selects stories having the same, or similar, types for inclusion in the newsfeed. Additionally, the newsfeed manager 235 may analyze stories received by the social networking system 140 from various users and obtains information about user preferences or actions from the analyzed stories. This information may be used to refine subsequent selection of stories for newsfeeds presented to various users.

The social networking system 140 includes a state processing module 240, which identifies one or more states associated with objects in the content store 210. In one embodiment, the state processing module 240 identifies a state from content received from a user. As a specific example, if a user provides content stating it is happy because of winning $5,000 in Las Vegas, the state processing module 240 identifies three states from the content describing the user: "happy," "won $5,000," and "in Las Vegas." In one embodiment, the state processing module 240 identifies state information for a user from received content by identifying anchor terms included in the content and determining a meaning of the anchor terms as further described in U.S. application Ser. No. 13/167,701, filed Jun. 24, 2011, which is hereby incorporated by reference in its entirety. Structured information associated with content received from a user may also be used to extract a state associated with the content. After determining one or more states associated with content maintained in the content store 210, the state processing module 240 stores the identified one or more states and an association between the states and an object identifier corresponding to the content. In various embodiments, associations between object identifiers and states are stored in the state processing module 240 or in the content store 210 to simplify retrieval of one or more states associated with an object identifier or retrieval of object identifiers associated with a state.

The state processing module 240 may also use the context associated with content received from a user to identify one or more states of the user. For example, if a user provides content to the social networking system 140 indicating it is running for school president, the state processing module 240 uses context identified from the provided content or associated with the provided content to determine that the user is running for an office and not performing the physical activity of running. If the state processing module 240 is unable to identify one or more states from content received from the user, the state processing module 240 may generate a list of candidate states matching at least a portion of the received content. For example, the state processing module 230 may not have enough context information from "watching the bears" to determine whether the user is watching bears (animals) to watching, a University of California (Golden Bears or Bears) sports game, a Chicago Bears football game, etc. In this example, the state processing module 230 may generate a list of candidate states (e.g., "watching Cal. Bears," "Chicago Bears," "bears," etc.) and presents them to the user, the user may then select the correct state information. To determine or sort the candidate states, the state processing module 240 may access information stored in the user profile store 205, the content store 210, the action log 220, or the edge store 225.

In addition to identifying a user's states, the state processing module 240 may train machine learned models to predict states. For example, if the social networking system 140 frequently receives inputs from a user at 6 A.M. stating that the user is tired, one or more machine learned models may predict that the user is tired at 6 A.M. on any given day. Machine learned models may also predict states based on other states determined from content provided by a user. For example, the social networking system 140 commonly receives content from a user indicating the user is at a restaurant after receiving content indicating the user is at a concert, machine learned models may predict a state for the user indicating the user is hungry after receiving content indicating the user is at a concert even if subsequent content is not received.

The web server 245 links the social networking system 140 via the network 120 to the one or more client devices 110, as well as to the one or more third party systems 130. The web server 245 serves web pages, as well as other web-related content, such as JAVA®, FLASH®, XML and so forth. The web server 245 may receive and route messages between the social networking system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 245 may provide application programming interface (API) functionality to send data directly to native client device operating systems, such as IOS®, ANDROID™, WEBOS® or RIM®.

Presentation of State Information

Figure 3:
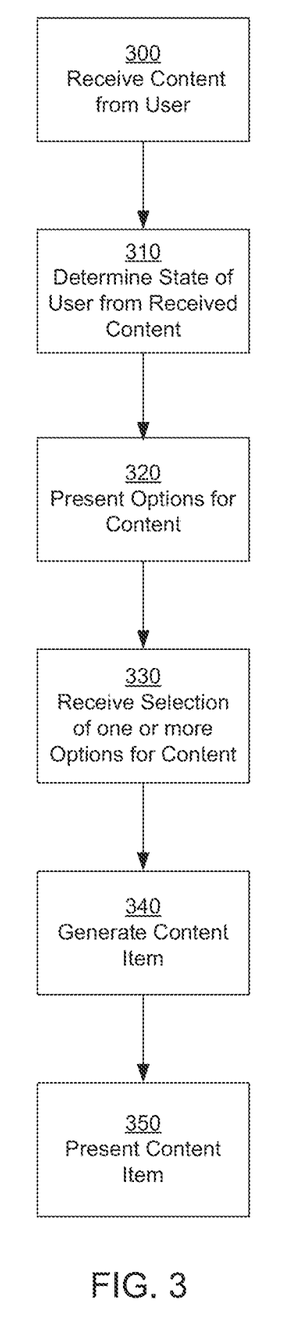
FIG. 3 is a flow chart of a method for displaying information about a user's state, in accordance with an embodiment of the invention.
Figure 4:
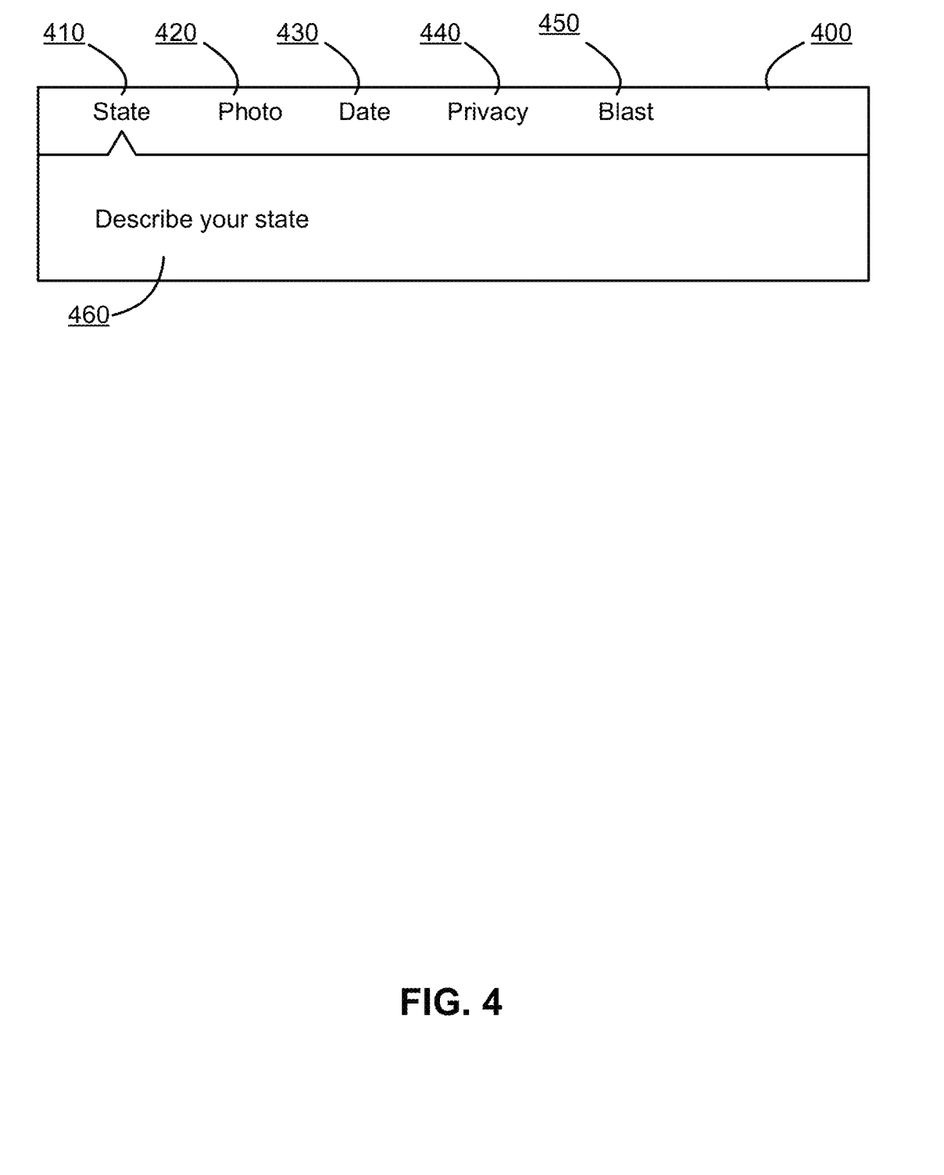
FIG. 4 is an example of a state user interface for displaying information about a user's state, in accordance with an embodiment of the invention.

FIG. 3 is a flow chart of one embodiment of a method for displaying information about a user's state. The social networking system receives 300 content from a user and determines 310 a state of the user from the received content. For example, the interface generator 230 generates a state user interface 400, as illustrated in the example of FIG. 4, including a field 460 in which a user provides content describing the user's state 410. The social networking system 140 determines 310 a state describing one or more characteristics of the user from the content provided in the field 460, or provided through any other suitable channel. For example, the state processing module 240 determines 310 a state describing a characteristic of the user from the received input.

In one embodiment, the state processing module 240 presents the user with a list of candidate states matching at least a portion of the received content and receives a selection of a state from the user. As described above, the candidate states may be identified based on information associated with the user, such as user profile information, connections, content associated with the user, or actions associated with the user. For example, if the social networking system 140 receives content from a user indicating that a user is riding, a candidate state of horseback riding is determined 310 if the state processing module 240 determines from the user's profile that one of the user's hobbies is horseback riding. The candidate states in the list may be ordered based on states previously associated with the user or based on states associated with other users connected to the user. The determined state may be stored in a user profile associated with the user.

The social networking system 140 presents 320 one or more options for inclusion in a content item associated with the state of the user. The presented options may be selected from a set of options based on the user's state. Referring again to FIG. 4, the state user interface 400 presents 320 one or more options selected from a set of options. Examples of options from the set of options that include entering a date and/or time associated with the state (e.g., a start time, an end time, a publication time, etc.) 430, uploading a photograph or video associated with the state 420, specifying privacy settings associated with the content (e.g., who can view the content) 440, and sending notifications to other users asking the other users have the same state as the state determined from the received content (e.g., sending a "blast") 450. Depending on the determined state, different options from the set of options may be presented 320. For example, the option to upload a photograph or video may not be presented for certain states or the option to specify a time may not be presented for certain states.

When the social networking system 140 receives 330 a selection of one or more options, a content item is generated 340 based on the state and the selected one or more options. The content item includes information describing the state and may also describe information based on the one or more selected options. For example, the determined state may indicate that the user is "hungry" and a selected option associates a time with the state; hence, the content item describes the state and identifies the associated time. The content item is stored and associated with the user. For example, the content item may be stored in the action log 220, the content store 210, or the user profile store 205. The content item is then presented 350 to social networking system users. For example, the content item is presented 350 in a state display on the user's profile page or is presented in a story included in a newsfeed presented to additional users of the social networking system 140.

Displaying and Searching User States

Figure 5A:
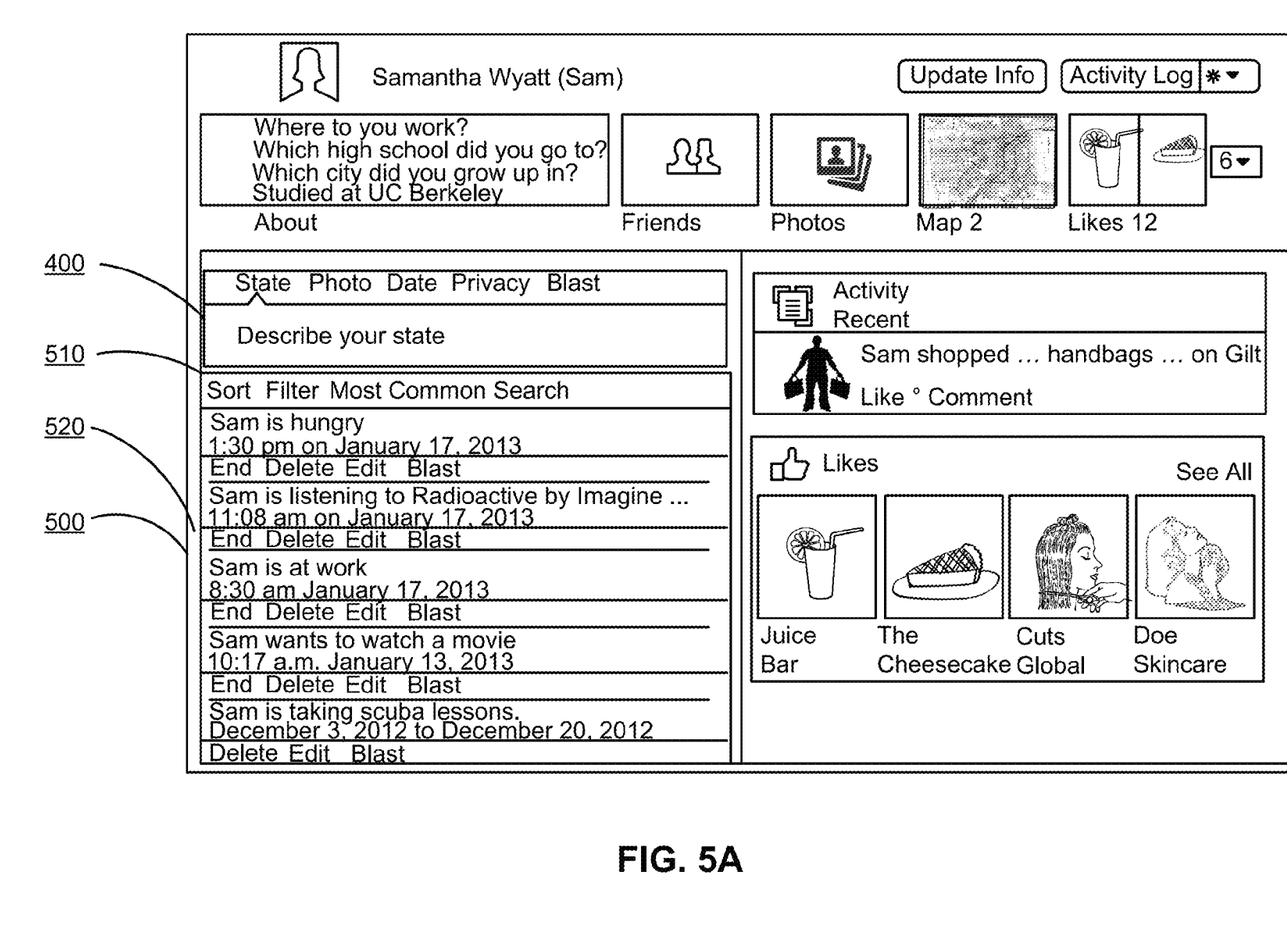
FIGS. 5A and 5B are examples of a state display interface for displaying information about a user's states, in accordance with an embodiment of the invention.
Figure 5B:
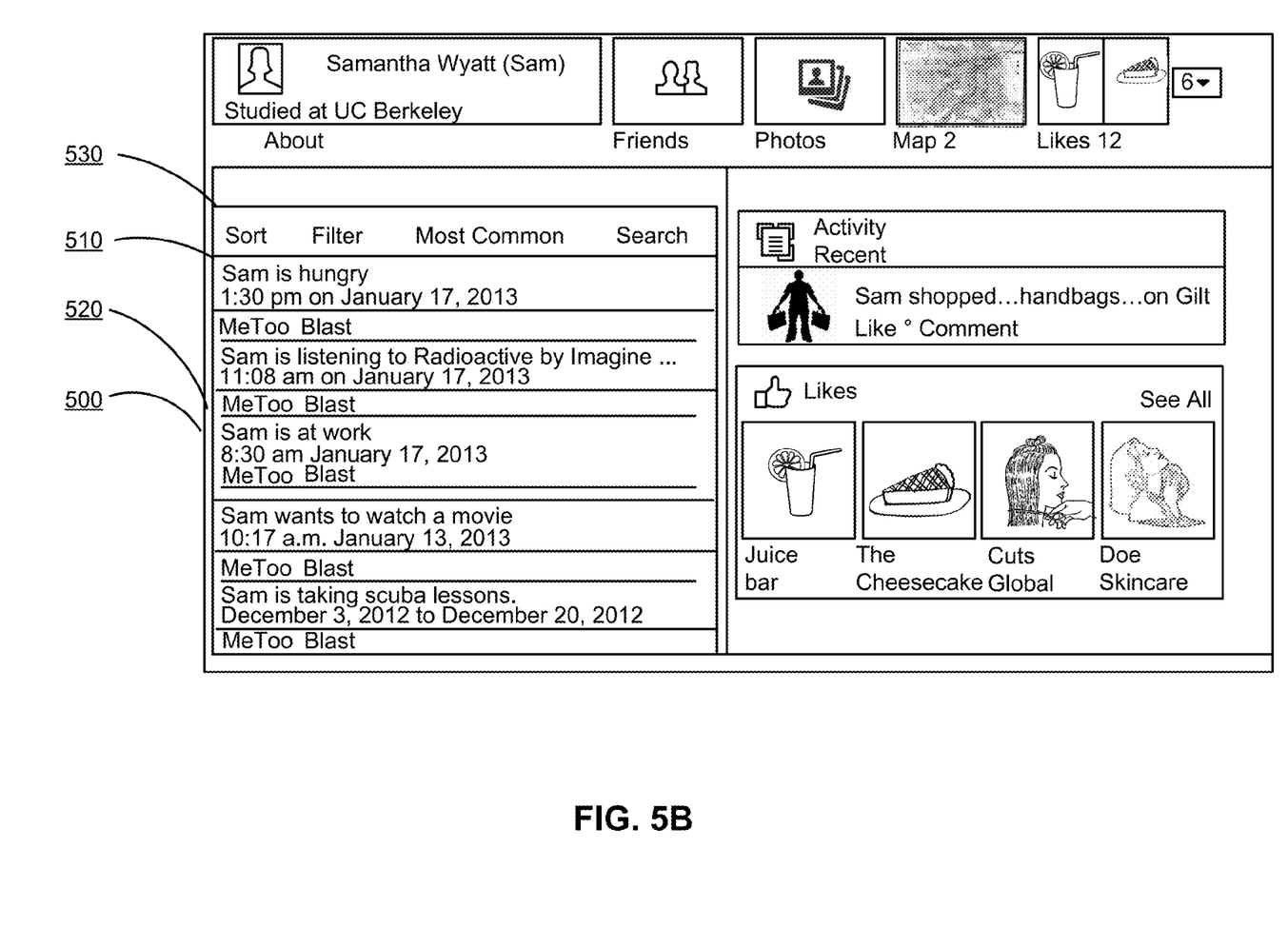

FIGS. 5A and 5B are examples of a state display interface displaying states associated with a user. In the example of FIG. 5A, the state display interface is presented the user providing content from which a state was derived. FIG. 5B shows an example of a state display interface shown to an additional user viewing a state of a user. Users may view information specific to a state by selecting the state (i.e., "pivoting" around the state). Examples of state-specific information presented when a state is selected include: users connected to the user viewing a state, users within a threshold distance of the user viewing a state, and a time or date at which a state is associated with at least a threshold number of users.

In one embodiment, the state display interface displays a historical log 500 of states describing a user, such as the user viewing the state display interface. The user viewing the state display may navigate through or view multiple states in the historical log 500. As shown in FIG. 5A, the state display interface shown to the user providing content from which a state is determined includes options 510 for the user to filter or sort its states (e.g., by date, by time, by type, etc.) or to view the state most commonly describing the user. FIG. 5B illustrates that the state display interface shown to an additional user viewing a user's state includes options 530 allowing the additional user to filter or sort its states (e.g., by date, by time, by type, etc.) or to view the state most commonly describing the user, and to view states shared between the additional user and the user.

A shown in FIG. 5A the state display interface presents additional options 520 to a user viewing its own states. Examples of these additional options 520 include allowing the user to specify an end date for a state associated with the user, delete a state, edit a state, and ask other users if they share a state with the user (e.g., by selecting a "blast" option). Similarly, FIG. 5B shows additional options 540 presented to an additional user viewing a user's state including an option ask other users if they share a state with the user and an option to associate a state describing the user with the additional user.

Figure 6:
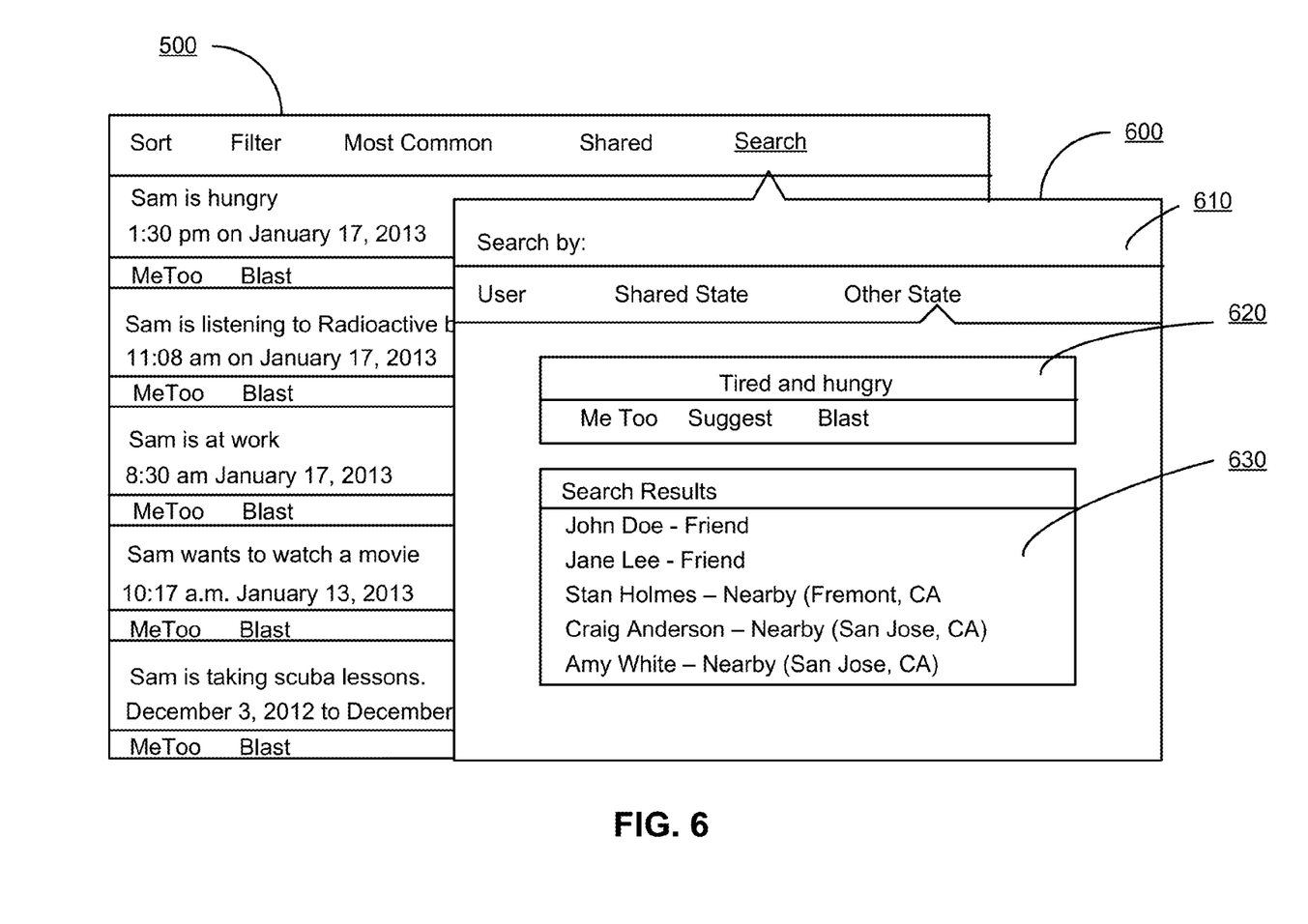
FIG. 6 is an example of an interface for performing searches associated with a state, in accordance with an embodiment of the invention.

The social networking system 140 allows users to perform searches for information on the social networking system 140 relating to states. FIG. 6 is an example of a state search user interface 600 for searching for information associated with a state. The state search user interface 600 includes options 610 allowing a user to search the social networking system 140 for information including states of other users, information identifying other users sharing a state of the user accessing the state search user interface 600, and information identifying other users having a state provided to the state search user interface 600. Search results 630 presented by the state search user interface 600 may include a list of users currently associated with one or more states identified to the state search user interface 600 or users that were associated with one or more states at a specified time. In the example of FIG. 6, the search results 630 may identify users who are currently both tired and hungry or who were tired and hungry at a specified time. Additionally, the state search user interface 600 may allow users to specify whether search results 630 are limited to users connected to the user performing the search, limited to users within a threshold geographical distance of the user performing search, or otherwise limited. The search results may also be sorted or filtered based on user preferences or settings. The social networking system 140 also provides a user with an option 620 to attribute one or more states identified by search results 630 to itself, to suggest or attribute a state in the search results 630 to other users, to ask other users if they have a state identified by the search results 630, or perform any other suitable action.

Figure 7A:
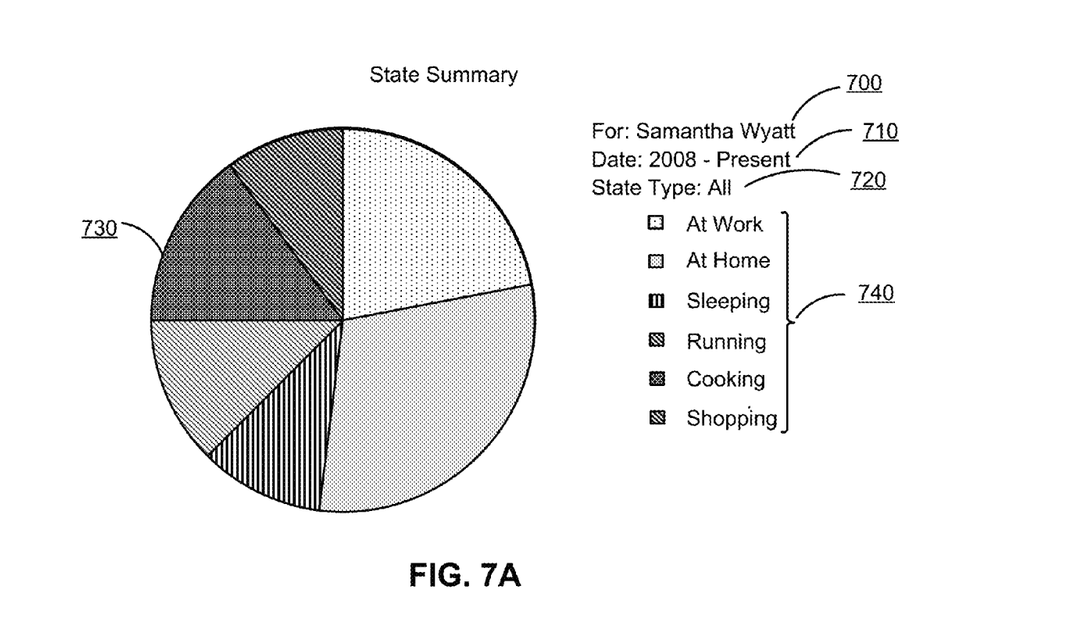
FIGS. 7A and 7B are examples of a state aggregation user interface, in accordance with an embodiment of the invention.
Figure 7B:
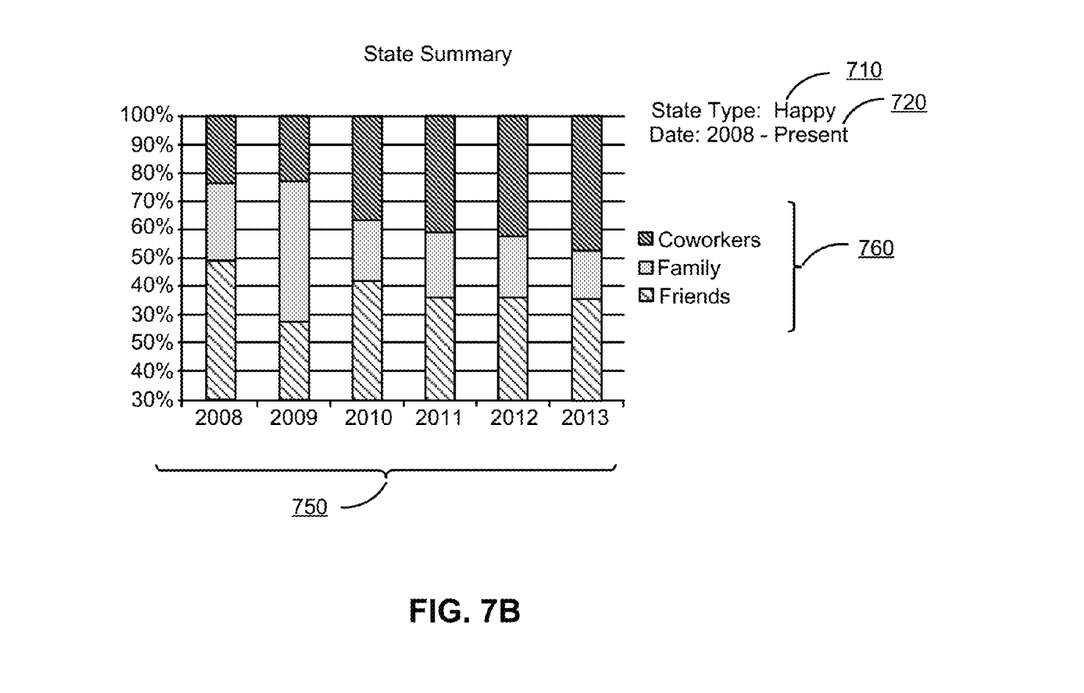

The social networking system 140 may aggregate information about a specific user or a specific state for presentation to other users. FIGS. 7A and 7B are examples of a state aggregation user interface. State information about a user, either presented on a user's profile page or as a result of a state-based search, may be aggregated to summarize information about a user's states over time. The aggregated information may be presented in a variety of formats. In the example of FIG. 7A, a pie chart 730 shows a percentage of time that a specific user 700 spent in various states 720 during a specified time period 710. The pie chart 730 may organize the information based on type 740 of state provided by the user (e.g., at work, at home, sleeping, etc.). In one embodiment, the displayed states are limited to specific types of states (e.g., emotions, locations, activities, etc.) or specific states (e.g., running, cooking, shopping, etc.) that are selected by the user viewing the aggregated information.

A summary of information about a state describes several users over a period of time may also be presented. In the example of FIG. 7B, a bar graph shows the number of users of the social networking system 140 having a specified state 710 (e.g., "happy") over a specific time interval 720 (2008-present in the example of FIG. 7B). The bar graph may organize the information by type 760 of user (e.g., coworkers, family, and friends) and time ranges 750 (e.g., year). In one embodiment, users described in the summary are limited to specific users (e.g., users connected to the user viewing the summary, users within a threshold distance of the user viewing the summary, etc.)

Enhancement of User Experience

The social networking system 140 may use state information provided by users to enhance interaction with users. For example, a user elects to receive notifications through the social networking system 140 based on the user's state. A user may limit receipt of notifications to those form other users connected to the user by a specific type of connection if the user's state is "asleep." In another embodiment, advertisements may be targeted to a user based on the user's state and the user's privacy settings. For example, if a user's privacy settings allow sharing of state information with other entities and the user's state is "tired," advertisements for coffee advertisements may be selected for presentation to the user, while advertisements including coupon codes are selected for a user having a state of "broke." Additionally, applications may receive or post information about a user's states from the social networking system 140 based on permissions set by the user. For example, a user may give a shopping application permission to receive information about the user's state or to send notifications to the user when the user's state involves getting paid. As another example, a user may give an exercise-tracking application permission to post a user's state only when the state involves "running" or "biking"

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
   accessing, by a processor, a user profile describing a user of a social networking system;

receiving, by the processor, content from the user of the social networking system via a client device associated with the user;

determining, by the processor, a state of the user from at least the received content the state including text that describes one or more characteristics of the user, wherein the one or more characteristics include an emotion, a location, and an action associated with the user, and wherein determining the state comprises:

identifying one or more terms in the received content; and determining meanings of the one or more terms by applying a machine learned model, wherein inputs to the machine learned model include a time and a social context associated with the received content;

maintaining, by the processor, information describing the determined state of the user, including states associated with one or more additional users of the social networking system;

providing, by the processor, to the client device for presentation to the user one or more options to be included in a content item associated with the state of the user, the one or more options selected from a set of options based on the state of the user;

receiving, by the processor, a selection of one or more of the presented options;

generating, by the processor, the content item for the state of the user based on the selection of one or more of the presented options;

providing, by the processor, the generated content item to one or more client devices, including the client device, for presentation to one or more users of the social networking system;

receiving, by the processor, a selection of the state from the client device;

determining, by the processor, at least one of the one or more additional users of the social networking system who share the state of the user at the specified time, and are within a threshold geographic distance to the user at the specified time; and providing, by the processor, to the client device a listing of the one or more additional users.

2. The method of claim 1, wherein the one or more characteristics include at least one of a circumstance of the user, an attribute of the user, or a thought of the user.

3. The method of claim 1, wherein the set of options based on the state of the user includes options for specifying one or more selected from a group consisting of: a start date, an end date, a publication date, privacy settings, and any combination thereof.

4. The method of claim 1, wherein the generated content item includes one or more options for identifying additional states.

5. The method of claim 4, wherein the one or more options for identifying additional states are selected from a group consisting of: viewing one or more states describing the user during a specified time period, viewing one or more states describing one or more additional users of the social networking system during the specified time period, filtering one or more states of the user based on one or more criteria, sorting one or more states of the user based on one or more parameters, and viewing a most common state of the user.

6. The method of claim 1, further comprising:

receiving a query from a client device associated with an additional user of the social networking system, the query based on state information.

7. The method of claim 1, wherein the generated content item includes one or more options for identifying additional states, the one or more options for identifying additional states selected from a group consisting of: ending the state, deleting the state, editing the state, adding the state, attributing the state to one or more additional users of the social networking system, sending a notification associated with the state to additional users of the social networking system, and any combination thereof.

8. The method of claim 1, wherein determining, by the processor, the state of the user from at least the received content further comprises:

determining one or more candidate states based on the received content; and presenting the one or more candidate states to the user.

9. The method of claim 8, wherein a candidate state is selected from a group consisting of: a state describing an additional user of the social networking system during a time period, one or more states describing one or more additional users of the social networking system, a most common state of a set of users of the social networking system, and any combination thereof.

10. The method of claim 9, wherein the one or more additional users of the social networking system are users connected to the user.

11. The method of claim 1, further comprising:

selecting an advertisement for presentation to the user based at least in part on the state of the user.

12. The method of claim 1, wherein providing, by the processor, to the client device for presentation to the user one or more options to be included in a content item associated with the state of the user comprises:

providing one or more candidate states matching a portion of the received content to the client device for presentation to the user.

13. The method of claim 12, wherein the candidate states are based at least in part on connections between the user and objects maintained by the social networking system or information in the user profile describing the user.

14. The method of claim 1, further comprising providing the generated content item in a story associated with the user to the client device for presentation to the user.

15. The method of claim 1, further comprising:

storing the state of the user and an association between the state of the user and the user profile.

16. The method of claim 1, further comprising:

receiving a selection of the state of the user from an additional user; and providing information associated with the state of the user to a client device associated with the additional user for presentation, the information associated with the state of the user selected from a group consisting of: other users sharing the state, other users in the state, other users in a combination of the state and an additional state, and any combination thereof.

17. A computer implemented method comprising:

receiving, by a processor, content from a user of a social networking system via a client device associated with the user;

determining, by the processor, a state of the user from the received content, the state including text that describes one or more characteristics of the user, wherein the one or more characteristics include an emotion, a location, and an action associated with the user, and wherein determining the state comprises:

identifying one or more terms in the received content; and determining meanings of the one or more terms by applying a machine learned model, wherein inputs to the machine learned model include a time and a social context associated with the received content;

maintaining, by the processor, information describing the determined state of the user, including states associated with one or more additional users of the social networking system;

providing, by the processor, to the client device for presentation to the user one or more options to be included in a content item associated with the state of the user, the one or more options selected from a set of options based on the state of the user;

receiving, by the processor, a selection of one or more of the presented options;

generating, by the processor, the content item for the state of the user based on the selection of one or more of the presented options;

providing, by the processor, the generated content item to the client device for presentation to the user;

receiving, by the processor, a selection of the state from the client device;

determining, by the processor, at one of the one or more additional users of the social networking system who share the state of the user at the specified time, and are within a threshold geographic distance to the user at the specified time; and providing, by the processor, to the client device a listing of the one or more additional users.

18. The method of claim 17, wherein the one or more characteristics of the user include at least one of a circumstance of the user, an attribute of the user, or a thought of the user.

19. The method of claim 17, wherein the set of options based on the state of the user includes options for specifying one or more selected from a group consisting of: a start date, an end date, a publication date, privacy settings, and any combination thereof.

20. The method of claim 17, wherein the one or more options for the content item associated with the state of the user are selected from a group consisting of: ending the state, deleting the state, editing the state, adding the state, attributing the state to one or more additional users of the social networking system, sending a notification associated with the state to additional users of the social networking system, and any combination thereof.

21. The method of claim 17, wherein providing, by the processor, the generated content item to the client device for presentation to the user comprises:

providing the generated content item to the client device such that the client device presents the content item and one or more options for identifying additional states to the user, the one or more options selected from a group consisting of: viewing one or more states describing the user during a specified time period, viewing one or more states describing one or more additional users of the social networking system during the specified time period, filtering one or more states of the user based on one or more criteria, sorting one or more states of the user based on one or more parameters, and viewing a most common state of the user.

22. The method of claim 17, further comprising:

aggregating information about one or more states of one or more additional users of the social networking system; and providing the aggregated information to the client device for presentation to the user.

23. The method of claim 17, further comprising:

selecting an advertisement for presentation to the user based at least in part on the state of the user.

24. The method of claim 17, further comprising:

providing the generated content item to one or more client devices for presentation to one or more users of the social networking system.

25. The method of claim 1, further comprising:

providing an option to a first client device, of the one or more client devices, to associate the state of the user with an additional user associated with the first client device;

receiving a selection of the option; and responsive to the received selection, setting a first state of the additional user as the state of the user.

* * * * *

UNITED STATES PATENT AND TRADEMARK OFFICE
CERTIFICATE OF CORRECTION

PATENT NO. : 9,781,218 B2
APPLICATION NO. : 13/911378
DATED : October 3, 2017
INVENTOR(S) : Samuel Lessin et al.

Page 1 of 1

It is certified that error appears in the above-identified patent and that said Letters Patent is hereby corrected as shown below:

In the Claims

Column 17, Line 23, after "at" insert -- least --.

Signed and Sealed this
Twenty-fourth Day of July, 2018

Andrei Iancu
*Director of the United States Patent and Trademark Office*